N. L. HATCH.
Running Gear.
No. 85,093.
Patented Dec. 22, 1868.
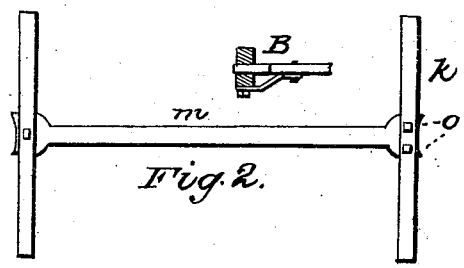
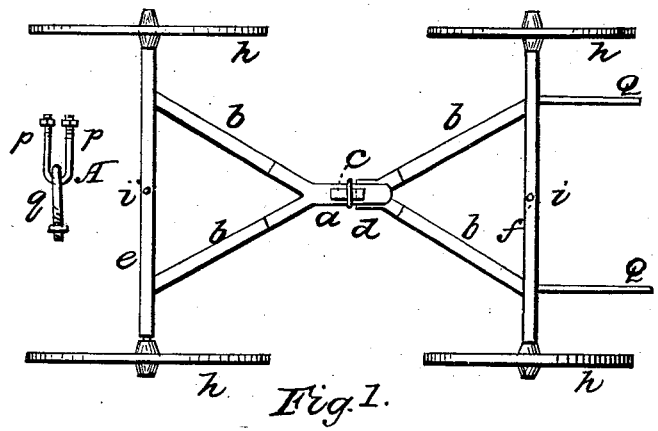
Witnesses
Henry T Carter
Henry C Houston
Inventor:
N L Hatch Per Atty
M↳Cliffen

NEHEMIAH L. HATCH, OF CAPE ELIZABETH, MAINE, ASSIGNOR TO HIMSELF AND CHARLES DYER, OF SAME PLACE.

*Letters Patent No. 85,093, dated December 22, 1868.*

IMPROVEMENT IN CARRIAGES.

The Schedule referred to in these Letters Patent and making part of the same.

*To all whom it may concern:*

Be it known that I, NEHEMIAH L. HATCH, of Cape Elizabeth, in the county of Cumberland, and State of Maine, have invented a new and useful Improvement in Carriages; and I hereby declare the following to be a full, clear, and exact description thereof, which will enable others to make and use my invention, reference being had to the accompanying drawings, forming part of this specification, in which—

Figure 1 shows a top plan of the two axles, and the method of uniting the same, together with the two bolt-holes.

Figure 2, a view of the rocker and draw-bar.

A, the jointed bolt of the front axle and forward part of the rocker.

B, the manner in which the draw-bar is united to the rocker.

I am aware that patents have been granted for running gear of carriages where the turning or cramping of the front axles turns also the back or rear wheels. Such are patents Nos. 34,342 and 33,566.

This is effected by different devices, as shown in said patents, one by means of teeth or cogs midway between the axles, and another by a joint at the centre or midway between the two pairs of wheels.

My device for effecting the simultaneous motion of the rear and front axles is shown at *a*.

*b* are the perches of the carriage.

*a* shows a piece of metal attached to one half of the perch and having a slot, *c*.

*d* shows a stud on the other part of the perch, and so made as to slide in the slot *c*.

Now, as the forward axle is turned, and the wheel cramped either on one or the other side, it is apparent that the rear wheel on the same side will also be drawn inwardly, and the length of the slot *c* regulates the extant to which these wheels will thus be turned inwardly toward the perch. Thus the carriage can be turned in a much smaller or more contracted space.

Disclaiming other devices different in principle and operation, and not claiming broadly thus enabling a carriage to turn within a short space, I desire to claim only the method herein shown and described.

*e* is the rear,

*f*, the forward axle.

*h*, the wheels.

*g*, the shafts.

*i* are bolt-holes in the axles.

*j* is the rear,

*k*, the forward rocker.

*m*, the draw-bar, that is, the rear axle is not drawn after the forward one by the perches *b*, because stud *d* does not touch the forward end of slot *c*, when the perch is straight, as is shown in fig. 1.

*n o* show bolt-holes in the rockers, to unite them by bolts to the axles. Thus it will be seen that the bar *m* unites in drawing the forward and rear axles of the carriage. The forward bolt is jointed, A. This allows the rocking motion of the forward rocker and axle,

*p* fits into the two holes *o* in the rocker;

*q*, into the hole *i* in the forward axle.

Thus the carriage can be turned in a contracted space, and the device, *m*, for uniting the two axles is as strong as if the slot *c*, stud *d*, &c., were not used.

I am not aware of any patent where the rockers, with bolts to unite them to the axles, the jointed bolt, and draw-bar *m*, are employed. The convenience of this is that it is applicable to a common carriage-body.

Neither am I aware of any device similar to that shown at *a c d* for effecting the short turn of the carriage.

The bolt that fits into *n* on the rocker *j*, and *i* on the rear axle, allows the rocker to turn on the axle, but does not admit of the rocking or tipping motion, as in the front rocker. This is illustrated by B.

A further advantage of this arrangement will be seen from the following remarks:

On even roads, it often happens, in travelling, that the rear end of the carriage slides first to the one side and then to the other, thus bringing the body of the carriage, or some of the under work, in contact with the forward wheel, thus rendering it liable to capsize. The same is the case when the animal "shies," turns suddenly round, or backs.

With my arrangement, the forward wheel cannot rub against the carriage, because the stud *d* and slot *c* regulate the extent to which the wheels can be turned inwardly. If the forward bolt should break, the two axles would still be held together by the stud and slot.

I am aware of G. L. Haussknecht's patent, December, 1858, No. 8,588, but his devices are different from mine, and his arrangement and operation are different.

I do not claim the employment of two segments and fifth-wheels operating as shown in said patent. Mine is different from this, in that the perches *b b b b* are rigidly attached to the front and rear axles. In the one above referred to, there are three joints; in mine, but one. In the reference, the rocker has a circle and the front axle a circle, one upon the other, the upper circle remaining stationary, while the under one moves as the wheels are turned. The rear axle is provided with a segment and a jointed arm attached to the rear axle.

In my invention, I employ the stud and slot, similar to Haussknecht's, but do claim the same by itself.

In order to give the free up-and-down motion to the shafts, which would otherwise be lost, I employ the jointed bolt A.

What I claim as my invention, and desire to secure by Letters Patent, is—

The combination, with the perches *b b b b*, rigidly connected to the axles *e f*, and united to each other by the sliding joint *c d*, of the rigid draw-bar *m* and jointed bolt A, all as and for the purposes set forth.

NEHEMIAH L. HATCH.

Witnesses:
WILLIAM H. CLIFFORD,
HENRY C. HOUSTON.